(12) United States Patent
Sempuku et al.

(10) Patent No.: US 11,277,743 B2
(45) Date of Patent: Mar. 15, 2022

(54) PASS DETERMINATION DEVICE AND DISPLAY METHOD

(71) Applicant: MITSUBISHI ELECTRIC CORPORATION, Tokyo (JP)

(72) Inventors: Tsuyoshi Sempuku, Tokyo (JP); Yoshinori Saikawa, Tokyo (JP); Hisataka Kizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/846,119

(22) Filed: Apr. 10, 2020

(65) Prior Publication Data

US 2020/0245145 A1    Jul. 30, 2020

Related U.S. Application Data

(63) Continuation of application No. PCT/JP2017/041300, filed on Nov. 16, 2017.

(51) Int. Cl.
*H04W 12/06* (2021.01)
*G06F 21/31* (2013.01)
*H04L 29/06* (2006.01)

(52) U.S. Cl.
CPC ............ *H04W 12/06* (2013.01); *G06F 21/31* (2013.01); *H04L 63/08* (2013.01)

(58) Field of Classification Search
CPC .... H04W 12/06; H04L 63/08; G07C 9/00896; G07C 9/00309; G07C 9/00944;

(Continued)

(56) References Cited

U.S. PATENT DOCUMENTS

| 6,119,096 A | * | 9/2000 | Mann | G06Q 20/341 |
| | | | | 705/5 |
| 2005/0015630 A1 | * | 1/2005 | Yumoto | G07C 9/257 |
| | | | | 726/19 |

(Continued)

FOREIGN PATENT DOCUMENTS

| JP | 2005-190117 A | 7/2005 |
| JP | 2013-3998 A | 1/2013 |
| JP | 2013-152665 A | 8/2013 |

OTHER PUBLICATIONS

International Search Report for PCT/JP2017/041300 dated Feb. 20, 2018.

(Continued)

*Primary Examiner* — Michael Y Mapa
(74) *Attorney, Agent, or Firm* — Birch, Stewart, Kolasch & Birch, LLP

(57) ABSTRACT

A pass determination device includes: a receiving unit for receiving authentication information from an authentication device of a user; a determining unit for determining whether or not to permit the user to pass on the basis of the authentication information received by the receiving unit; and a display unit for displaying a position of an authentication area in a first display mode from before the user enters the authentication area, the authentication area being an area through which the user having the authentication device is to pass so that an authentication process based on the authentication information of the authentication device is performed.

13 Claims, 7 Drawing Sheets

(58) Field of Classification Search
CPC .. G07C 9/20; G07C 9/00; G07B 15/00; G06F 21/31
USPC ............... 455/41.1–41.2, 410–411, 414.1
See application file for complete search history.

(56) References Cited

U.S. PATENT DOCUMENTS

| | | | |
|---|---|---|---|
| 2007/0211925 A1* | 9/2007 | Aoki ............... | G06K 9/00255 382/118 |
| 2015/0317853 A1* | 11/2015 | Reymann ............ | G07C 9/28 340/5.7 |
| 2016/0042631 A1 | 2/2016 | Ho | |

OTHER PUBLICATIONS

Office Action for Japanese Patent Application No. 2018-524310 dated Jul. 3, 2018.
Extended European Search Report, dated Oct. 27, 2020, for European Application No. 17932219.3.
Communication pursuant to Article 94(3) EPC dated Aug. 26, 2021 in corresponding European Patent Application No. 17932219.3.

\* cited by examiner

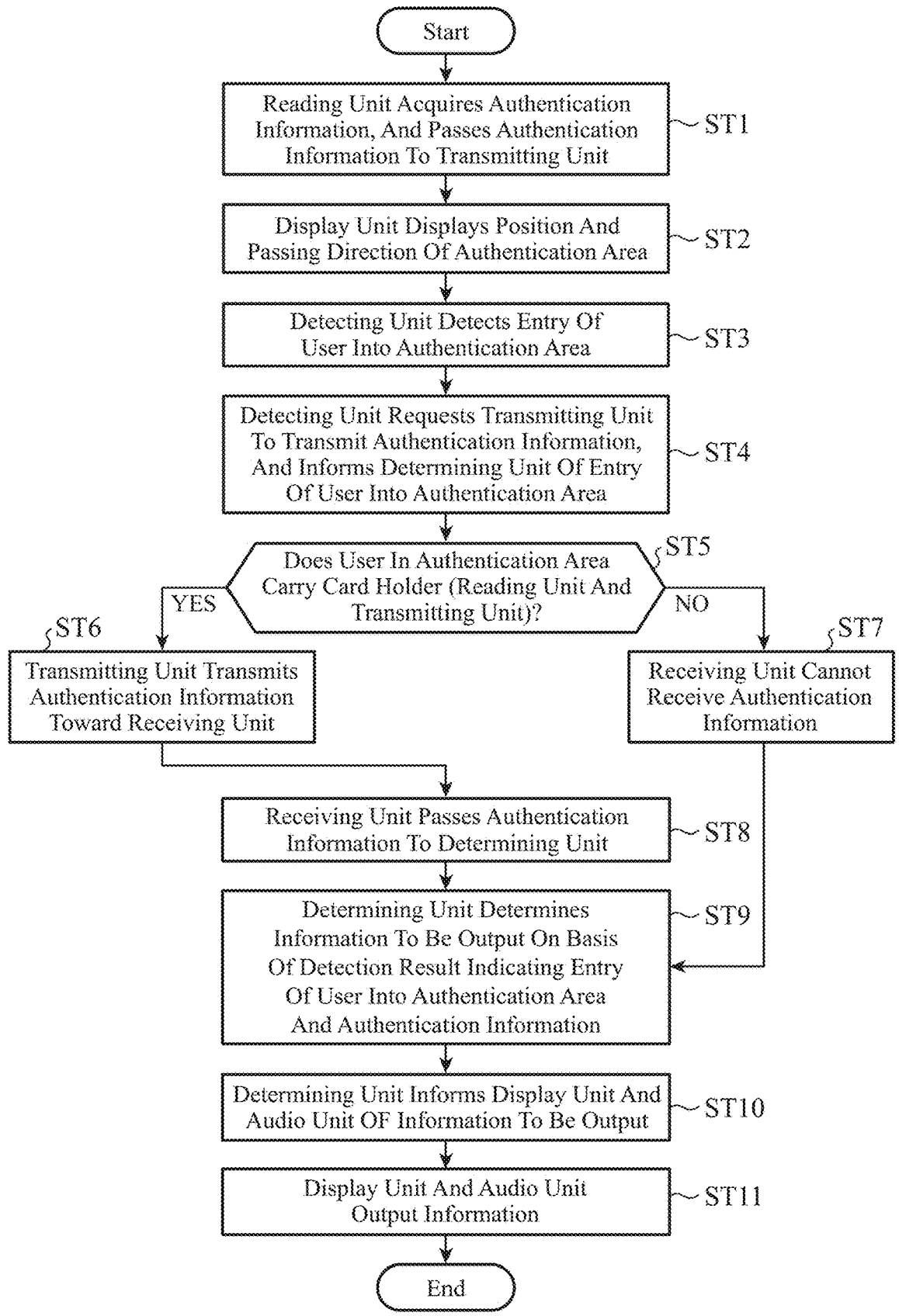

FIG. 7

| Authentication Result | Output Information |
|---|---|
| N/A (User Is Present In Authentication Area But No Authentication Information Transmitted) | Display: Passing Not Permitted, Audio: Warning Sound |
| Permit Passing With Commuter Pass | Display: Passing Permitted, Audio: OK Sound |
| Expiration of Commuter Pass Period | Display: Passing Not Permitted, Audio: Warning Sound And Audio Saying "The Commuter Pass Period Has Expired" |
| Enough Balance | Display: Passing Permitted, Audio: OK Sound |
| Not Enough Balance | Display: Passing Not Permitted, Audio: Warning Sound |
| ... | ... |

PASS DETERMINATION DEVICE AND DISPLAY METHOD

CROSS REFERENCE TO RELATED APPLICATIONS

This application is a Continuation of PCT International Application No. PCT/JP2017/041300, filed on Nov. 16, 2017, which is hereby expressly incorporated by reference into the present application.

TECHNICAL FIELD

The present invention relates to a pass determination device configured to determine whether or not to permit a user using a passage to pass, and a display method.

BACKGROUND ART

Gate systems have been installed at entrances of buildings and ticket gates in stations for the purpose of preventing unauthorized entry of users. Among such gate systems, flat gate systems allowing smooth passage of users have been provided. The flat gate systems include no gate devices, arrange the functions of the gate devices on floor surfaces of passages, and have fully flat shapes as overall structures. A flat gate system of related art is taught in Patent Literature 1, for example.

CITATION LIST

Patent Literatures

Patent Literature 1: JP 2013-152665 A

SUMMARY OF INVENTION

Technical Problem

With the flat gate system of the related art, however, which do not include gate devices arranged along a passage, unlike gate systems including gate devices, it is difficult for users to recognize the passage. In a flat gate system, in order to perform pass determination on users, the users need to pass through a predetermined authentication area. It is therefore necessary for users to easily recognize the position of the authentication area.

The present invention has been made to solve the aforementioned problems, and an object thereof is to provide a pass determination device and a display method that enables a user to recognize the position of an authentication area.

Solution to Problem

A pass determination device according to the present invention includes: a receiver to receive authentication information from an authentication device of a user; a determiner to determine whether or not to permit the user to pass on the basis of the authentication information received by the receiver; and a display to display indication indicating a position of an authentication area in a first display mode from before the user enters the authentication area, the authentication area being an area through which the user having the authentication device is to pass so that an authentication process based on the authentication information of the authentication device is performed, wherein the receiver is provided on a floor surface of a ticket gate passage.

Further, a pass determination device according to the present invention includes: a receiver to receive authentication information from an authentication device of a user; a determiner to determine whether or not to permit the user to pass on a basis of the authentication information received by the receiver; and a display to display indication indicating a position of an authentication area in a first display mode from before the user enters the authentication area, the authentication area being an area through which the user having the authentication device is to pass so that an authentication process based on the authentication information of the authentication device is performed, wherein the display is a display to allow the user to recognize both sides of the authentication area.

A display method according to the present invention includes: receiving authentication information from an authentication device of a user, on a floor surface of a ticket gate passage; determining whether or not to permit the user to pass on the basis of the received authentication information; and displaying indication indicating a position of an authentication area from before the user enters the authentication area, the authentication area being an area through which the user having the authentication device is to pass so that an authentication process based on the authentication information of the authentication device is performed.

Further, a display method according to the present invention includes: receiving authentication information from an authentication device of a user; determining whether or not to permit the user to pass on a basis of the received authentication information; and displaying indication allowing the user to recognize positions of both sides of an authentication area from before the user enters the authentication area, the authentication area being an area through which the user having the authentication device is to pass so that an authentication process based on the authentication information of the authentication device is performed.

Advantageous Effects of Invention

The present invention enables users to recognize the position of an authentication area.

BRIEF DESCRIPTION OF DRAWINGS

FIG. 5 is a diagram illustrating states in which determination results are displayed in an authentication area.

FIG. 6 is a flowchart illustrating procedures of the flat gate system in which the pass determination device according to the first embodiment of the present invention is used.

FIG. 7 is a table illustrating an example of a determination table.

DESCRIPTION OF EMBODIMENTS

Embodiments for carrying out the invention will now be described with reference to the accompanying drawings for more detailed explanation of the invention.

First Embodiment

Figure 1:
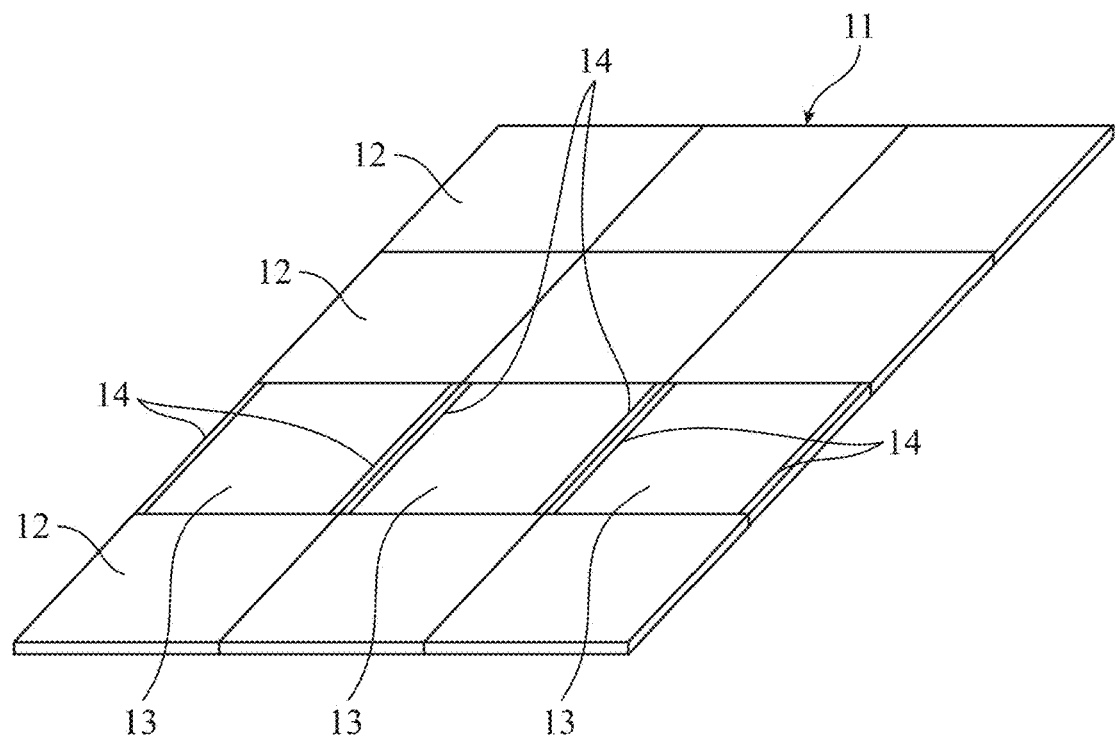
FIG. 1 is an external view of a flat gate system in which a pass determination device according to a first embodiment of the present invention is used.

A pass determination device according to the first embodiment can be used in a flat gate system serving as an automatic ticket gate at a station. The flat gate system for a station illustrated in FIG. 1 is installed at a ticket gate passage 11. The ticket gate passage 11 is a passage through which users using the station pass.

The ticket gate passage 11 includes a plurality of floor panels 12 that are tightly laid, each floor panel 12 being a rectangular plate-like floor material. In other words, the floor surface of the ticket gate passage 11 is constituted by a plurality of floor panels 12. In addition, the surfaces of a plurality of floor panels 12 arranged at predetermined positions on the ticket gate passage 11 are each set as an authentication area 13.

Note that, in FIG. 1, three authentication areas 13 representing a plurality of authentication areas 13 are illustrated. While the three authentication areas 13 are arranged in the width direction of the floor panels 12 in FIG. 1, a plurality of authentication areas 13 may be placed apart from each other on the ticket gate passage 11. Furthermore, the number of authentication areas 13 may be one.

Display units 14 are provided on both sides in the width direction of each of the floor panels 12 constituting the authentication areas 13. The display unit 14 includes a plurality of light emitting diodes, for example, which are arranged at regular intervals along the length direction of the floor panel 12 at each of both sides in the width direction of the floor panel 12.

All the light emitting diodes can emit light of the same one of white, blue, and red. Thus, the display unit 14 is capable of employing any one of a first display mode, a second display mode, and a third display mode, which will be described later, by turning light on and off and switching between light-on states and light-off states using emission and non-emission of the light emitting diodes.

Figure 2:
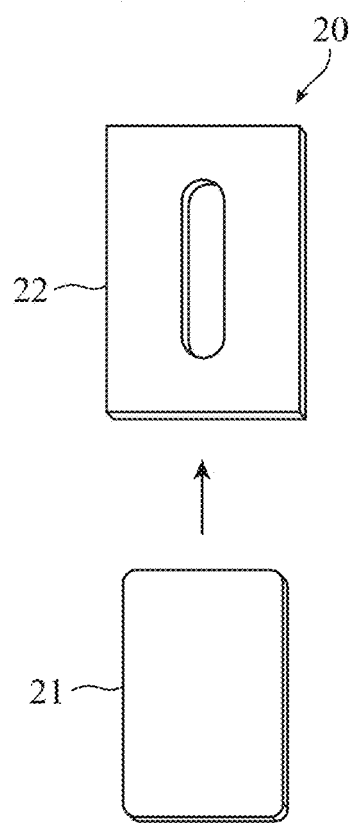
FIG. 2 is a diagram illustrating an example of a configuration of an authentication device.

FIG. 2 illustrates an example of a configuration of an authentication device 20. The authentication device 20 includes a contactless IC card 21 and a card holder 22. The card holder 22 is a holder for accommodating the IC card 21. Users who pass through the ticket gate passage 11 individually carry their respective authentication devices 20.

The IC card 21 corresponds to a pass such as a ticket or a commuter pass, and has stored therein authentication information on the user. Examples of the authentication information include personal identification information for identifying a person, designated pass section information, pass expiration date information, and balance information.

The card holder 22 is capable of reading the authentication information stored in the IC card 21 accommodated therein, and further capable of transmitting the read authentication information toward the authentication areas 13 by using radio communication.

The authentication device 20 includes the contactless IC card 21 and the card holder 22, but is not limited to such a configuration, and may have any configuration that enables authentication information transmitted from a user side via radio communication to be received at the passage side.

A smart phone, for example, may be used as the authentication device 20. In this case, authentication information can be stored in advance in the smart phone, and the smart phone can be accommodated in a smart phone cover corresponding to the card holder 22. Alternatively, the smart phone alone may constitute the authentication device 20. Such a smart phone that constitutes the authentication device 20 alone not only has authentication information stored in advance but also has radio communication functions.

Thus, the flat gate system in which the pass determination device according to the first embodiment is used includes no reader/writer over which the IC card 21 is to be passed and no gate device including a flapper for blocking unauthorized entry of users, but has a flat structure as a whole in which only the floor panels 12 that are tightly laid are present.

Furthermore, when a user carrying the authentication device 20 passes through the ticket gate passage 11, the flat gate system receives the authentication information stored in the IC card 21 at the position of an authentication area 13, and determines whether or not to permit the user to pass on the basis of the received authentication information. Thus, an authentication area 13 is an area through which a user that has the authentication device 20 should pass so that an authentication process based on the authentication information from the authentication device 20 is performed.

Next, the configuration of the flat gate system in which the pass determination device according to the first embodiment is used will be described in detail with reference to FIGS. 3 to 5A, and 5B.

Figure 3:
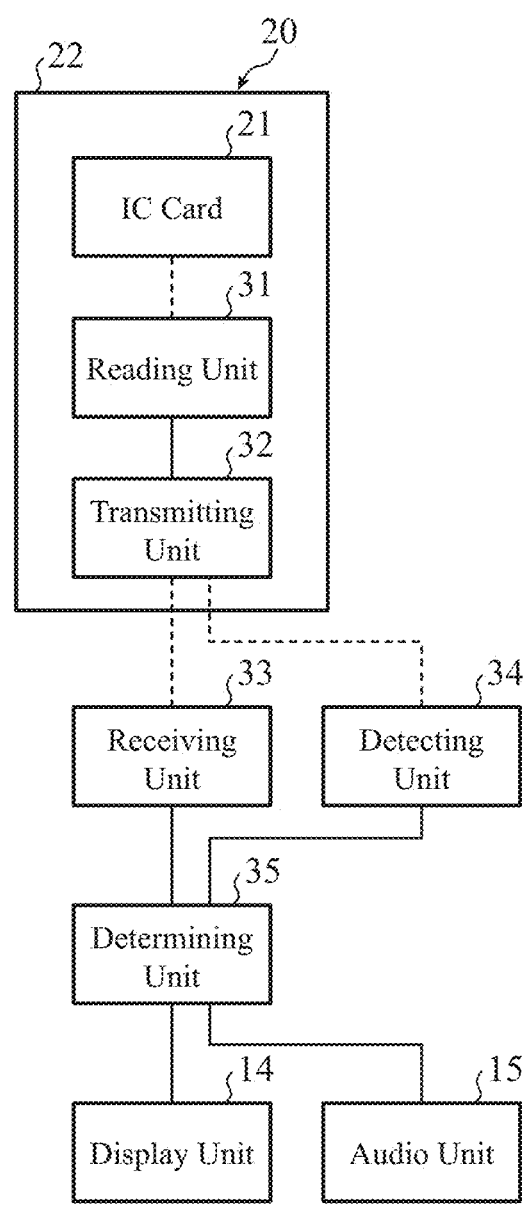
FIG. 3 is a block diagram illustrating a configuration of the flat gate system in which the pass determination device according to the first embodiment of the present invention is used.

As illustrated in FIG. 3, the flat gate system includes, in addition to the configuration described above, a reading unit 31, a transmitting unit 32, a receiving unit 33, a detecting unit 34, a determining unit 35, and an audio unit 15. The reading unit 31 and the transmitting unit 32 are provided in the card holder 22. In contrast, the receiving unit 33, the detecting unit 34, the determining unit 35, the display unit 14, and the audio unit 15 are provided on the ticket gate passage 11 side.

The reading unit 31 acquires the authentication information necessary for authentication from the IC card 21 in a contactless manner, and passes the acquired authentication information to the transmitting unit 32.

The transmitting unit 32 transmits the authentication information passed by the reading unit 31 toward the receiving unit 33 via radio communication. Note that the transmitting unit 32 is capable of transmitting the authentication information in response to a transmission request transmitted by the detecting unit 34, which will be described later.

The receiving unit 33 receives the authentication information transmitted by the transmitting unit 32 via radio communication, and passes the received authentication information to the determining unit 35.

The detecting unit 34 detects whether or not a user has entered the authentication area 13, and passes the result of detection to the determining unit 35. Examples of such a detecting unit 34 include a weight sensor embedded under the authentication area 13, an infrared sensor with a detection range being a space directly above the authentication area 13, and a camera with an imaging area being the space directly above the authentication area 13.

The determining unit 35 performs the authentication process on the authentication information passed from the receiving unit 33 on the basis of the authentication information and the detection result passed from the detecting unit 34, and thereafter determines whether or not to permit passing of the user on the basis of the result of authentication. The determining unit 35 also passes the determination result to the display unit 14 and the audio unit 15.

The display unit 14 displays the position of the authentication area 13 in the first display mode before a user enters the authentication area 13. Alternatively, the display unit 14 displays the position of the authentication area 13 in the first display mode from before a user enters the authentication area 13 until the determining unit 35 determines whether or not to permit passing of the user.

The first display mode is a display mode including a display mode enabling a user to recognize the direction in which the user should pass through the authentication area 13. Further, the first display mode is a display mode in which a display mode enabling a user to recognize the direction in which the user should pass through the authentication area 13 and a display mode indicating the position of the authentication area 13 to the user in a recognizable manner are displayed alternately.

A display method by which the display unit 14 displays the position of the authentication area 13 in the first display mode will be explained with reference to FIG. 4.

Figure 4:
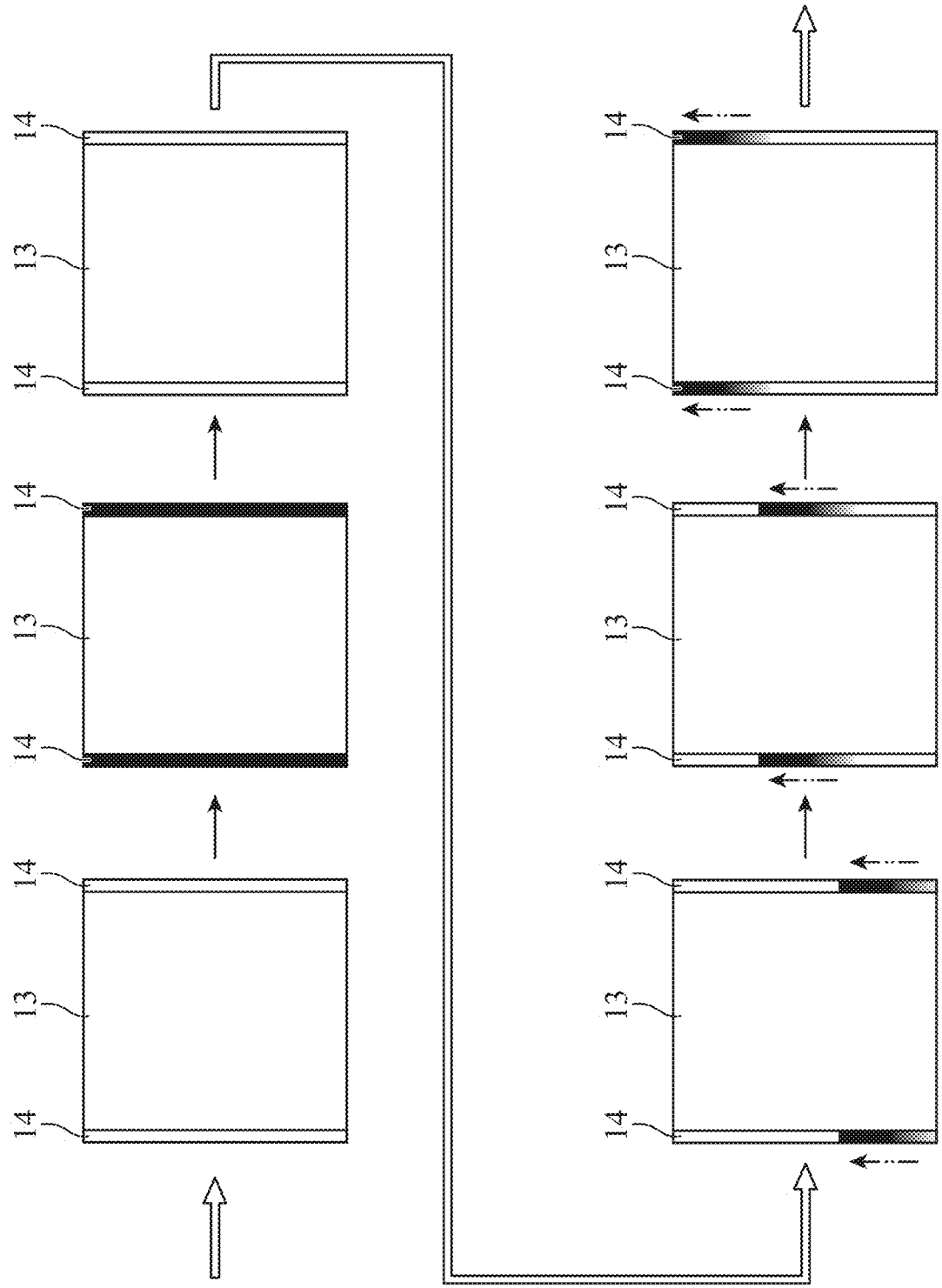
FIG. 4 is a diagram illustrating states in which the position of an authentication area is displayed in a first display mode.

Three successive animations on the upper part of FIG. 4 illustrate a light emitting pattern for the display unit 14 to display the position of the authentication area 13, and correspond to the display mode indicating the position of the authentication area 13 to the user in a recognizable manner. In addition, three successive animations on the lower part of FIG. 4 illustrate a light emitting pattern for the display unit 14 to display the passing direction of the authentication area 13, and correspond to the display mode enabling the user to recognize the direction in which the user should pass through the authentication area 13.

Note that, in the case where the display unit 14 displays the position of the authentication area 13, all the light emitting diodes blink in white at the same time over the entire length of the floor panel 12 at both sides in the width direction of the authentication area 13.

In contrast, in the case where the display unit 14 displays the passing direction of the authentication area 13, the light emitting diodes blink in white in such a manner that light emission bands of a predetermined length move from the upstream side toward the downstream side of the passing direction. The moving direction of the light emission bands is the passing direction in which a user should pass through the authentication area 13, and is coincident with the length direction of the floor panel 12 and perpendicular to the width direction of the floor panel 12.

The display unit 14 then alternately repeats the light emitting pattern for displaying the position of the authentication area 13 and the light emitting pattern for displaying the passing direction of the authentication area 13 from before a user enters the authentication area 13 until the authentication process performed by the determining unit 35 is completed.

The display unit 14 also displays the determination result passed by the determining unit 35, that is, the determination result indicating whether or not to permit the user to pass, in the second display mode or the third display mode. This enables the display unit 14 to switch from the first display mode for displaying the position of the authentication area 13 to the second display mode or the third display mode for displaying the determination of whether or not to permit passing.

The second display mode is a display mode for displaying the intention by the determining unit 35 to permit passing. In addition, the third display mode is a display mode for displaying the intention by the determining unit 35 not to permit passing.

A display method by which the display unit 14 displays whether or not to permit a user to pass in the second display mode or the third display mode will be explained with reference to FIGS. 5A and 5B.

Figure 5A:
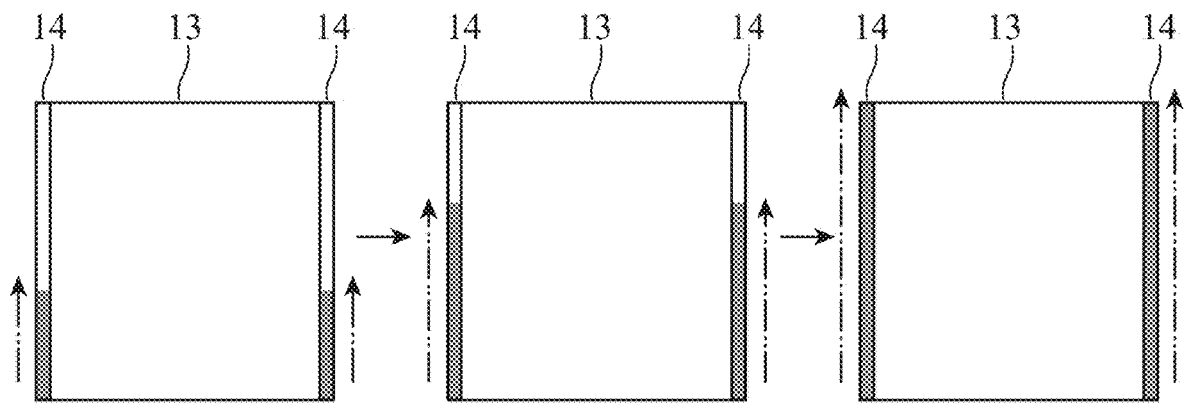
FIG. 5A is a diagram illustrating a state in which an intention to permit passing is displayed in a second display mode.

Three successive animations illustrated in FIG. 5A represent a state in which the display unit 14 displays the intention to permit passing in the second display mode when the determining unit 35 has determined to permit the user to pass. Specifically, for displaying that the user is permitted to pass, the display unit 14 makes the light emitting diodes blink in blue in such a manner than the lengths of light emissions extend from the upstream side toward the downstream side of the passing direction. The direction in which the light emission lengths extend is coincident with the passing direction in which the user should pass through the authentication area 13.

Figure 5B:
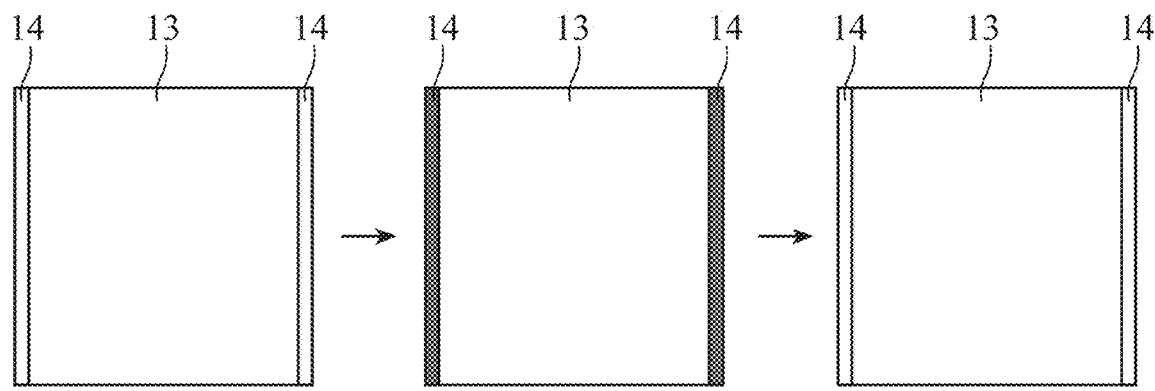
FIG. 5B is a diagram illustrating a state in which an intention not to permit passing is displayed in a third display mode.

In contrast, three successive animations illustrated in FIG. 5B represent a state in which the display unit 14 displays the intention not to permit passing in the third display mode when the determining unit 35 has determined not to permit the user to pass. Specifically, in the case where the display unit 14 displays that the user is not permitted to pass, all the light emitting diodes blink in red at the same time over the entire length of the floor panel 12 at both sides in the width direction of the authentication area 13.

Furthermore, a projector, a liquid crystal monitor, or the like may be employed for the display unit 14.

The projector is capable of projecting, on the surface of the authentication area 13, the position and the passing direction of the authentication area 13 or whether or not to permit a user to pass. In this case, the projector may not only project whether or not to permit passing, but also project where the user is to go when it is determined to permit passing.

The liquid crystal monitor is installed ahead of the authentication area 13 in the passing direction, and has a screen facing the authentication area 13. In addition, the liquid crystal monitor is capable of displaying the position and the passing direction of the authentication area 13, whether or not to permit passing, and where to go. This enables a user to easily recognize the displayed information by looking ahead.

The audio unit 15 outputs the determination result passed by the determining unit 35, that is, the determination result indicating whether or not to permit a user to pass, in the form of audio. Specifically, when the passed determination result indicates "to permit passing", the audio unit 15 outputs a sound indicating to permit passing. In contrast, when the passed determination result indicates "not to permit passing", the audio unit 15 outputs a warning sound indicating not to permit passing. In this case, the audio unit 15 may also output the intention not to permit passing in the form of audio in addition to the warning sound.

Next, procedures of the flat gate system in which the pass determination device according to the first embodiment is used will be explained in detail with reference to FIGS. 6 and 7.

As illustrated in FIG. 6, first, in step ST1, the reading unit 31 acquires authentication information from the IC card 21 accommodated in the card holder 22, and thereafter passes the acquired authentication information to the transmitting unit 32.

Subsequently, in step ST2, the display unit 14 starts repeating display of the position and the passing direction of the authentication area 13 alternately before a user enters the authentication area 13.

In step ST3, the detecting unit 34 then detects entry of the user into the authentication area 13.

Subsequently, in step ST4, the detecting unit 34 requests the transmitting unit 32 to transmit the authentication information, and informs the determining unit 35 of a detection result indicating that the user has entered the authentication area 13.

In step ST5, the determining unit 35 then determines whether or not the user having entered the authentication area 13 carries the card holder 22 accommodating the IC card 21. If the user carries the card holder 22, the processing proceeds to step ST6. In contrast, if the user does not carry the card holder 22, the processing proceeds to step ST7.

Subsequently, in step ST6, the transmitting unit 32 transmits the authentication information toward the receiving unit 33.

In step ST8, the receiving unit 33 then passes the authentication information to the determining unit 35.

In contrast, in step ST7, because the user having entered the authentication area 13 does not carry the card holder 22 accommodating the IC card 21, no authentication information is transmitted to the receiving unit 33. Thus, the receiving unit 33 cannot receive authentication information.

Subsequently, in step ST9, the determining unit 35 performs the authentication process on the basis of the detection result and the authentication information, determines whether or not to permit the user to pass on the basis of the authentication result, and sets information of the determination result to be output by the display unit 14 and the audio unit 15. At this point, because the authentication process performed by the determining unit 35 is completed, the display unit 14 terminates display of the position and the passing direction of the authentication area 13.

Note that the determining unit 35 has a determination table as illustrated in FIG. 7, for example. The determination table associates the authentication result based on the detection result and the authentication information, with the information to be output by the display unit 14 and the audio unit 15 on the basis of the determination result. The determining unit 35 selects the information to be output by the display unit 14 and the audio unit 15 depending on the authentication result by using the determination table.

Specifically, as illustrated in FIG. 7, when the authentication result indicates "to permit passing with a commuter pass" or "enough balance", the display unit 14 performs display to indicate that passing is permitted and the audio unit 15 outputs audio indicating that passing is permitted. At the same time, the display unit 14 may also cause the projector or the liquid crystal monitor to perform display to indicate that passing is permitted.

In contrast, as illustrated in FIG. 7, when the authentication result indicates "N/A", "expiration of commuter pass period", or "not enough balance", the display unit 14 performs display to indicate that passing is not permitted and the audio unit 15 output audio indicating that passing is not permitted. When the authentication result indicates "expiration of commuter pass period", audio indicating that "the commuter pass period has expired" is output. At the same time, the display unit 14 may cause the projector or the liquid crystal monitor to perform display to indicate that passing is not permitted.

Subsequently, in step ST10, the determining unit 35 informs the display unit 14 and the audio unit 15 of the information to be output associated with the authentication result as explained with reference to FIG. 7.

In step ST11, the display unit 14 then displays the determination result in line with the information to be output that is set by the determining unit 35. In addition, the audio unit 15 outputs the determination result in the form of audio in line with the information to be output that is set by the determining unit 35.

As described above, the pass determination device according to the first embodiment includes the display unit 14 that displays the position of the authentication area 13 in the first display mode from before a user enters the authentication area 13, which enables the user to recognize the position of the authentication area 13.

In addition, the display unit 14 displays the passing direction in which the user should pass through the authentication area 13, which can easily guide the user toward the authentication area 13. In addition, the display unit 14 is capable of displaying the position of the authentication area 13 and the passing direction of the authentication area 13 by a single configuration, which can save space and reduce cost as compared to a case where two display units for displaying the position and the passing direction individually.

Furthermore, the display unit 14 is capable of displaying whether or not to permit a user to pass on the basis of the authentication result, which can prevent unauthorized entry. In this case, the audio unit 15 is capable of outputting whether or not to permit the user to pass in the form of audio, which can improve the effect of preventing unauthorized entry as compared to a case where only the display unit 14 is provided.

Second Embodiment

A pass determination device according to a second embodiment is used in a flat gate system serving as an admission system of an office building. Three successive animations illustrated in FIG. 8 represent a projection state by a projector for displaying an intention to permit passing in the second display mode by the display unit 14 when the determining unit 35 has determined to permit a user to pass.

Multiple users who pass through an entrance passage of the office building each carry the authentication device 20. The IC card 21 corresponds to a staff ID card, and has stored therein personal identification information that is authentication information.

Figure 8:
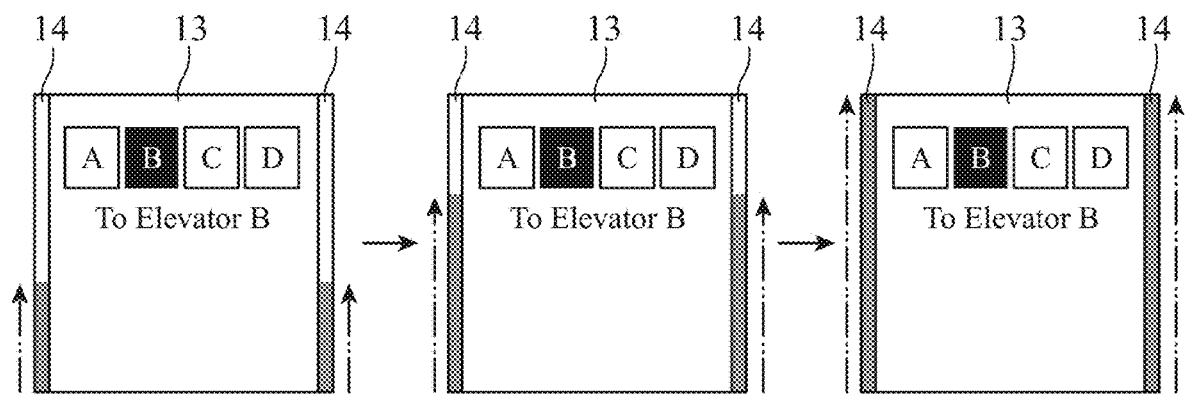
FIG. 8 is a diagram illustrating a projection state by a projector for displaying an intention to permit passing in a second display mode in a flat gate system in which a pass determination device according to a second embodiment of the present invention is used.

As illustrated in FIG. 8, when the determining unit 35 has determined to permit a user to pass, the display unit 14 performs display to indicate permission to pass and also displays where to go for the user. The display unit 14 uses a projector to project at least one of elevators A to D that can be taken and the boarding position thereof on the surface of the authentication area 13, for example.

The projector displays the order in which the elevators A to D are arranged, the boarding position of an elevator B that can be boarded among the elevators in a color different from those of the boarding positions of the elevators A, C, and D, and displays encouragement to board the elevator B in the form of projection of a text. The display unit 14 is capable of displaying permission to pass by blinking of the light emitting diodes and displaying where to go by projection with the projector at the same time, which can improve the convenience of users.

Note that the embodiments of the present invention can be freely combined, any components in the embodiments can be modified, and any components in the embodiments can be omitted within the scope of the invention.

INDUSTRIAL APPLICABILITY

A pass determination device and a display method according to the present invention enable a user to recognize an authentication area by displaying the position of the authentication area from before the user enters the authentication area, and are therefore suitable for a pass determination device and a display method that determine whether or not to permit a user using a passage to pass.

REFERENCE SIGNS LIST

11: Ticket gate passage, 12: Floor panel, 13: Authentication area, 14: Display unit, 15: Audio unit, 20: Authentication device, 21: IC card, 22: Card holder, 31: Reading unit, 32: Transmitting unit, 33: Receiving unit, 34: Detecting unit, 35: Determining unit.

The invention claimed is:

1. A pass determination device comprising:
a receiver to receive authentication information from an authentication device of a user;
a determiner to determine whether or not to permit the user to pass on a basis of the authentication information received by the receiver; and
a display to display indication indicating a position and borders of an authentication area in a first display mode from before the user enters the authentication area, the authentication area being an area through which the user having the authentication device is to pass so that an authentication process based on the authentication information of the authentication device is performed, wherein
the receiver is built into a floor panel provided on a floor surface of a ticket gate passage of a flat gate system, the floor panel comprising at least part of the authentication area.

2. The pass determination device according to claim 1, wherein
the display is a display to allow the user to recognize both sides of the authentication area.

3. The pass determination device according to claim 1, wherein
the display includes a plurality of displays arranged at the borders on both sides of the authentication area.

4. The pass determination device according to claim 1, wherein
the first display mode is a display mode including a display mode enabling the user to recognize a passing direction in which the user is to pass through the authentication area.

5. The pass determination device according to claim 1, wherein
the first display mode is a display mode in which a display mode enabling the user to recognize a passing direction in which the user is to pass through the authentication area and a display mode indicating the position of the authentication area to the user in a recognizable manner are displayed alternately.

6. The pass determination device according to claim 1, wherein
the display displays the position of the authentication area in the first display mode from before the user enters the authentication area until the determiner determines whether or not to permit passing of the user.

7. The pass determination device according to claim 1, wherein
the display displays an intention to permit passing of the user in a second display mode when the determiner has determined to permit the user to pass.

8. The pass determination device according to claim 1, wherein
the display displays an intention not to permit passing of the user in a third display mode when the determiner has determined not to permit the user to pass.

9. The pass determination device according to claim 1, wherein
the display displays a determination result by the determiner and a destination for the user.

10. The pass determination device according to claim 1, further comprising:
an audio device to output a determination result by the determiner in a form of audio.

11. A display method comprising:
receiving authentication information from an authentication device of a user, by a receiver built into a floor panel provided on a floor surface of a ticket gate passage of a flat gate system;
determining whether or not to permit the user to pass on a basis of the received authentication information; and
displaying indication indicating a position and borders of an authentication area from before the user enters the authentication area, the authentication area being an area through which the user having the authentication device is to pass so that an authentication process based on the authentication information of the authentication device is performed.

12. A pass determination device comprising:
a receiver to receive authentication information from an authentication device of a user;
a determiner to determine whether or not to permit the user to pass through a flat gate system on a basis of the authentication information received by the receiver; and
a display to display indication indicating a position of an authentication area in a first display mode from before the user enters the authentication area, the authentication area being an area through which the user having the authentication device is to pass so that an authentication process based on the authentication information of the authentication device is performed, wherein
the display is a display to allow the user to recognize, without the use of physical partitions, borders of an authentication area corresponding to opposite sides of the authentication area.

13. A display method comprising:
receiving authentication information from an authentication device of a user;
determining whether or not to permit the user to pass through a flat gate system on a basis of the received authentication information; and
displaying indication allowing the user to recognize, without the use of physical partitions, borders of an authentication area corresponding to opposite sides of the authentication area from before the user enters the authentication area, the authentication area being an area through which the user having the authentication device is to pass so that an authentication process based on the authentication information of the authentication device is performed.

\* \* \* \* \*